US012098814B2

(12) United States Patent
Aftyka

(10) Patent No.: US 12,098,814 B2
(45) Date of Patent: Sep. 24, 2024

(54) ILLUMINATION SYSTEM FOR LINE ILLUMINATION

(71) Applicant: SIGNIFY HOLDING B.V., Eindhoven (NL)

(72) Inventor: Slawomir Aftyka, Ryn (PL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/278,990

(22) PCT Filed: Feb. 18, 2022

(86) PCT No.: PCT/EP2022/054093
§ 371 (c)(1),
(2) Date: Aug. 25, 2023

(87) PCT Pub. No.: WO2022/179952
PCT Pub. Date: Sep. 1, 2022

(65) Prior Publication Data

US 2024/0133527 A1 Apr. 25, 2024
US 2024/0230041 A9 Jul. 11, 2024

(30) Foreign Application Priority Data

Feb. 25, 2021 (EP) .................................... 21159164

(51) Int. Cl.
*F21S 4/28* (2016.01)
*F21V 17/12* (2006.01)
(Continued)

(52) U.S. Cl.
CPC ................ *F21S 4/28* (2016.01); *F21V 17/12* (2013.01); *F21V 17/164* (2013.01); *F21Y 2115/10* (2016.08)

(58) Field of Classification Search
CPC .... F21S 4/28; F21S 4/20; F21V 17/12; F21V 17/164; F21V 17/16; F21V 17/104; F21V 21/14; F21V 21/005; F21Y 2115/10
See application file for complete search history.

(56) References Cited

U.S. PATENT DOCUMENTS 9,395,052 B1 7/2016 Shew
10,465,896 B2 * 11/2019 Van Winkle ............ F21S 8/061
(Continued)

FOREIGN PATENT DOCUMENTS

CN 107477529 A * 12/2017
DE 202015100867 U1 * 4/2015 .............. F21S 2/005
(Continued)

*Primary Examiner* — Zheng Song
*Assistant Examiner* — Glenn D Zimmerman

(57) ABSTRACT

In order to provide an illumination system for line illumination with a minimal intermediate gap between adjacent elongated trunks, which gap is maintained minimal over length of time, a coupling member is implemented and arranged for longitudinally connecting the elongated trunk in line with an adjacent further elongated trunk thereby forming a self-sustained trunked illumination system, with the coupling member having a first coupling portion to be fixed with the elongated trunk at its second trunk end portion thereof, as well as a second coupling portion structured to engage with the adjacent further elongated trunk at its first trunk end portion, the second coupling portion arranged in setting a gap distance between the two elongated trunks between a first configuration, wherein the gap distance is extant and a second configuration, wherein the gap distance is minimal, by imparting a tension force on the further elongated trunk in a longitudinal direction towards the first elongated trunk.

12 Claims, 10 Drawing Sheets

(51) Int. Cl.

| | |
|---|---|
| ***F21V 17/16*** | (2006.01) |
| ***F21Y 115/10*** | (2016.01) |

(56) References Cited

U.S. PATENT DOCUMENTS

| | | | | |
|---|---|---|---|---|
| 11,255,521 | B1 * | 2/2022 | McCane | F21V 7/0008 |
| 2008/0263977 | A1 | 10/2008 | Packard | |
| 2013/0343050 | A1 * | 12/2013 | Hu | F21S 4/28 362/217.14 |
| 2017/0261190 | A1 * | 9/2017 | Hierzer | F21S 8/063 |
| 2021/0388972 | A1 * | 12/2021 | Koch | F21V 19/004 |

FOREIGN PATENT DOCUMENTS

| | | | |
|---|---|---|---|
| DE | 202014106093 | U1 | 3/2016 |
| EP | 0870980 | A1 | 10/1998 |
| WO | 2000025063 | A2 | 5/2000 |
| WO | 2014045164 | A1 | 3/2014 |

* cited by examiner

ILLUMINATION SYSTEM FOR LINE ILLUMINATION

CROSS-REFERENCE TO PRIOR APPLICATIONS

This application is the U.S. National Phase application under 35 U.S.C. § 371 of International Application No. PCT/EP2022/054093, filed on Feb. 18, 2022, which claims the benefit of European Patent Application No. 21159164.9, filed on Feb. 25, 2021. These applications are hereby incorporated by reference herein.

TECHNICAL FIELD

The disclosure relates to an illumination system for line illumination composed of multiple elongated trunks longitudinally connected in line with each other, thereby forming a self-sustained trunked illumination system.

BACKGROUND OF THE DISCLOSURE

An illumination system for line illumination as outlined above is for example disclosed in the European patent application no. EP-A1-0870980. The illumination system described therein implements a coupling member, which partly overlaps the housings of adjacent elongated trunks and interconnects them in line in a clamping manner. Another solution is depicted in International patent application no. WO2014/045164A1, wherein multiple coupling members reach in the housings of adjacent elongated trunks and interconnect them in line by means of a pin-hole configured locking mechanism.

Both interconnection mechanisms, either by means of clamping or using pin-holes, fail to provide a complete intermediate gap-free interconnection between adjacent trunks, due to play and deformation between the coupling members and the trunks. Thus the adjacent trunks are not properly attuned to one another, leaving a visible intermediate gap present, which adversely affects the look and feel of the illumination system.

It is thus desirable to present an illumination system for line illumination composed of multiple elongated trunks longitudinally connected in line with each other with a minimal intermediate gap, which gap is maintained minimal over length of time.

SUMMARY OF THE DISCLOSURE

Accordingly, an illumination system for line illumination is proposed, comprising an elongated trunk having a first trunk end portion and an opposite second trunk end portion, at least a further elongated trunk having a first trunk end portion and an opposite second end portion, as well as a coupling member arranged for longitudinally connecting the elongated trunk in line with an adjacent further elongated trunk thereby forming a self-sustained trunked illumination system, with the coupling member having a first coupling portion to be fixed with the elongated trunk at its second trunk end portion thereof, as well as a second coupling portion structured to engage with the adjacent further elongated trunk at its first trunk end portion, the second coupling portion arranged in setting a gap distance between the two elongated trunks between a first configuration, wherein the gap distance is extant and a second configuration, wherein the gap distance is minimal, by imparting a tension force on the further elongated trunk in a longitudinal direction towards the first elongated trunk.

Accordingly, by imparting a continuous tension force on the further elongated trunk in a longitudinal direction towards the first elongated trunk, the further elongated trunk is displaced in the longitudinal direction towards the first elongated trunk, minimizing play and/or deformation of the parts interconnecting with each other and maintaining a minimal gap distance between adjacent trunks, also after a significant time of use of the illumination system. It is thus attained that the gap distance x between the two elongated trunks can be set between a first configuration wherein the gap distance x is extant or maximal, and a second configuration wherein the gap distance x is minimal, i.e. wherein the second trunk end portion of the elongated trunk abuts with an end face thereof against an end face of the first trunk end portion of the further elongated trunk.

In a preferred example of the disclosure the first coupling portion comprises a fixating opening through which a fixating pin can be passed for engagement with the first elongated trunk. Herewith an immovable interconnection of the coupling member with one of the elongated trunks is guaranteed, without any risk of the occurrence of play or deformation. This allows the coupling member to achieve a proper interconnection with the other adjacent elongated trunk with a long lasting minimal gap distance between them.

Preferably, the immovable interconnection of the coupling member with one of the elongated trunks is achieved as the first coupling portion comprises at least one member portion structured to engage with a wall section of the first elongated trunk, wherein the wall portion is provided with the fixating opening.

According to the claimed illumination system, which guarantees the long lasting minimal gap distance between adjacent trunks, the second coupling portion comprises a tensioning flange structured to engage with a tension screw accommodated in an opening in the further elongated trunk. By screwing the tension screw against the tensioning flange, the latter deforms and imparts a tension force on the further elongated trunk in the longitudinal direction of the illumination system towards the first elongated trunk. This results in a displacement in the longitudinal direction, thus closing the gap distance between both adjacent trunks towards a minimal distance. The screwing interaction between the tensioning flange and the tension screw allows for setting the gap distance x between the two elongated trunks and between the first configuration, wherein the gap distance x is extant or maximal, and the second configuration, wherein the gap distance x is minimal, that is the second trunk end portion of the elongated trunk abuts with its end face against the end face of the first trunk end portion of the further elongated trunk.

Preferably, the tensioning flange comprises two spaced apart tensioning flange members for accommodating the tension screw there between, thus guaranteeing a proper interlocking of the tension screw by the tensioning flange thus achieving a proper and long lasting imparting of tension on the adjacent elongated trunk.

In particular, tension force is imparted properly as the tensioning flange is angled with respect to a longitudinal direction of the coupling member.

The illumination system may have the feature that the coupling member is formed as a single-piece component, preferably manufactured from a metal, such a steel or aluminum, or manufactured from a light, but durable plastic, such as polycarbonate or polyamide. The single-piece coupling member is preferably manufactured from a sheet of metal and is produced by means of a punch or die-cut manufacturing technique. The single-piece component could be made of resilient material, such as spring steel or spring plastic, thus enabling repeatedly mounting and dismounting, and hence deforming, of the mounting element without the mounting element, at least initially, suffering from material fatigue.

In order to ascertain a proper engagement of the coupling member with the both adjacent elongated trunks, the coupling member comprises at least one side member portion, which is structured to engage with a wall section of both the first elongated trunk and the further elongated trunk. In particular, the coupling member comprises two side member portions, each structured to engage with an opposite wall section of both the first elongated trunk and the further elongated trunk.

To achieve a further improved engagement between the coupling member with one of the elongated trunks, the at least one side member portion comprises a flange extension structured to engage with the wall section of the further elongated trunk. Herewith a proper alignment of both adjacent trunks is achieved, further improving the minimization of the gap distance.

Furthermore, each elongated trunk is arranged in accommodating an elongated lighting carrier comprising at least one solid state light emitting source to form a continuous line of light.

The disclosure also pertains to a coupling member for use in a trunking illumination system as described in this disclosure.

BRIEF DESCRIPTION OF THE DRAWINGS

The disclosure will now be discussed with reference to the drawings, which show in.

DETAILED DESCRIPTION OF THE DRAWINGS

Figure 1:
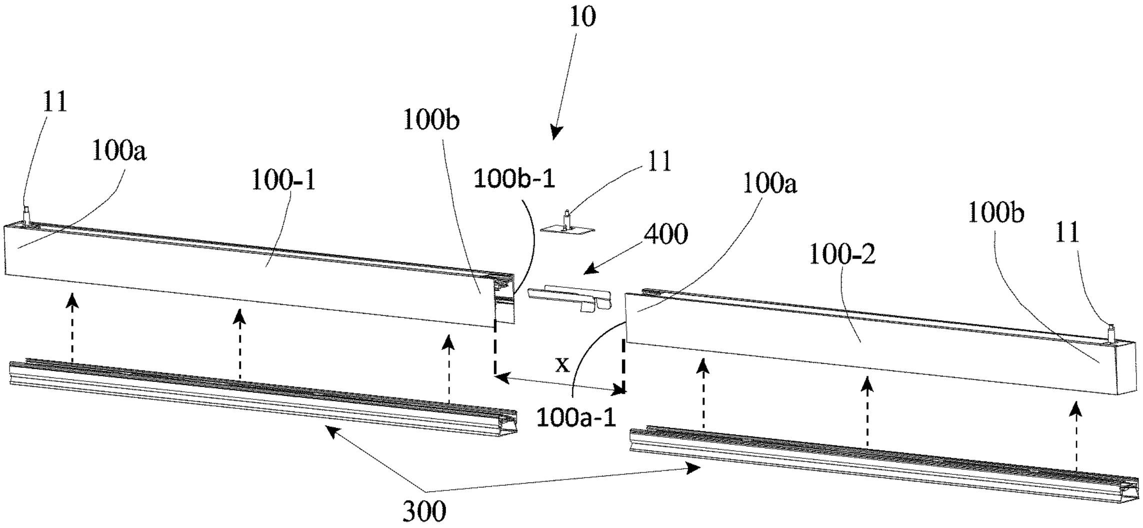
FIG. 1 schematically illustrates—in a first configuration—an exploded example of an embodiment of a trunking illumination system according to the present disclosure.

For a proper understanding of the disclosure, in the detailed description below corresponding elements or parts of the disclosure will be denoted with identical reference numerals in the drawings.

Figure 2:
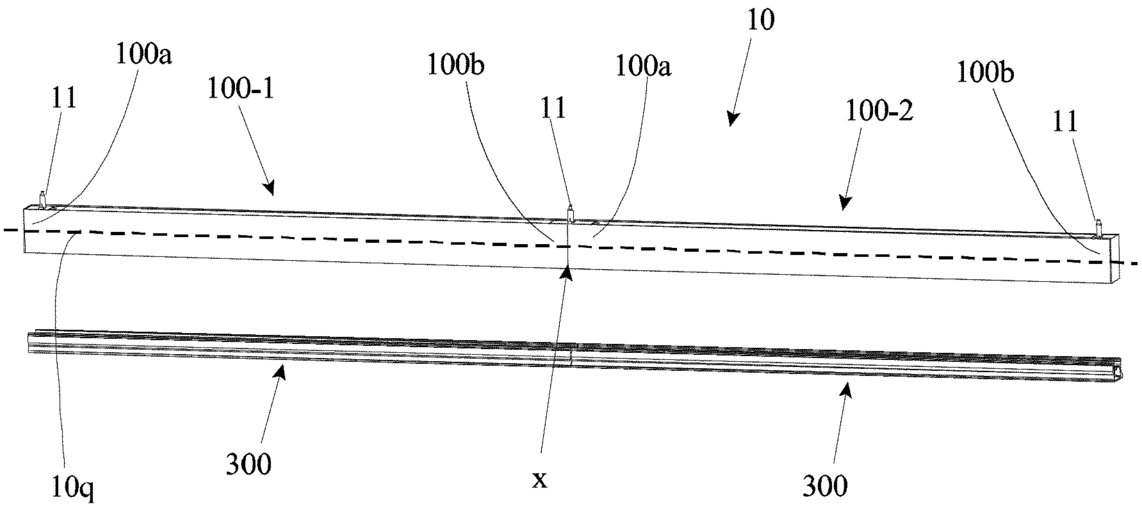
FIG. 2 schematically illustrate—in a second configuration—the example of an embodiment of the trunking illumination system according FIG. 1.

FIGS. 1 and 2 disclose an exemplary example of an illumination system for line illumination. The illumination system is denoted with reference numeral 10 and is composed of several elongated trunks, which are interconnected with each other in a longitudinal orientation thereof, thus forming a trunked illumination system capable of performing line illumination.

The example of the trunked illumination system 10 as shown in FIGS. 1 and 2 is composed of two elongated trunks, denoted as a first elongated trunk 100-1 and a further elongated trunk 100-2. It is observed, that the number of elongated trunks to be interconnected with each in longitudinal direction can be arbitrarily chosen. The example of two interconnected trunks 100-1 and 100-2 of FIGS. 1 and 2 is to be considered not limiting for the disclosure. The trunked illumination system 10 according to the disclosure can be composed of more than two elongated trunks for example with three elongated trunks 100-1, 100-2, 100-3, or more generally a number of n elongated trunks 100-1; 100-2; . . . ; **100-*n* can be implemented to form the trunked illumination system 10**.

The trunked illumination system 10 further comprises several mounting elements 11, which functionality is not relevant for a proper understanding of the disclosure. The mounting elements 11 interact with each elongated trunk, preferably near each interconnection point of adjacent elongated trunks. In an example, the mounting element 11 comprises a mounting plate having a mounting edge 11*z* which fits within a mounting slit 100*q* present in an inner surface of a wall section 100*x*-100*y* of each elongated trunk 100-1 and 100-2. The mounting elements 11 are structured to mount the complete self-sustained trunked illumination system 10 in a suspended fashion to a ceiling of a room or office space, preferably with the use of suspension wiring being connected with each mounting element 11 and a suitable suspension element (not shown and not relevant for the disclosure), the latter being mounted to or in the ceiling.

The housing of each elongated trunk 100-1; 100-2; . . . ; **100-*n* has a first trunk end portion 100***a* and an opposite, second trunk end portion 100*b*. When forming the trunked illumination system 10, each second trunk end portion 100*b* of an elongated trunk 100-1 is mechanically connected to the first trunk end portion 100*a* of an adjacent further elongated trunk 100-2. Similarly, in order to further expand the overall longitudinal length dimension 10*q* of the trunked illumination system 10, the opposite, second trunk end portion 100*b* of the adjacent elongated trunk 100-2 can be mechanically connected to the first trunk end portion 100*a* of a further adjacent elongated trunk 100-3 (not shown), etc. etc. till a desired length of the self-sustained trunked illumination system 10 is obtained.

For establishing line illumination, the housings of each elongated trunk 100-1; 100-2; . . . ; **100-*n* are structured in accommodating an elongated lighting carrier 300 comprising at least one solid state light emitting source (not shown). The elongated lighting carrier 300 can be mounted within the inner space 100***w* of the housing of each corresponding elongated trunk 100-1; 100-2; . . . ; **100-*n* using suitable and known connection means, such as a click or snap connection. When powered the trunked illumination system 10** forms a continuous line of light.

Figure 4:
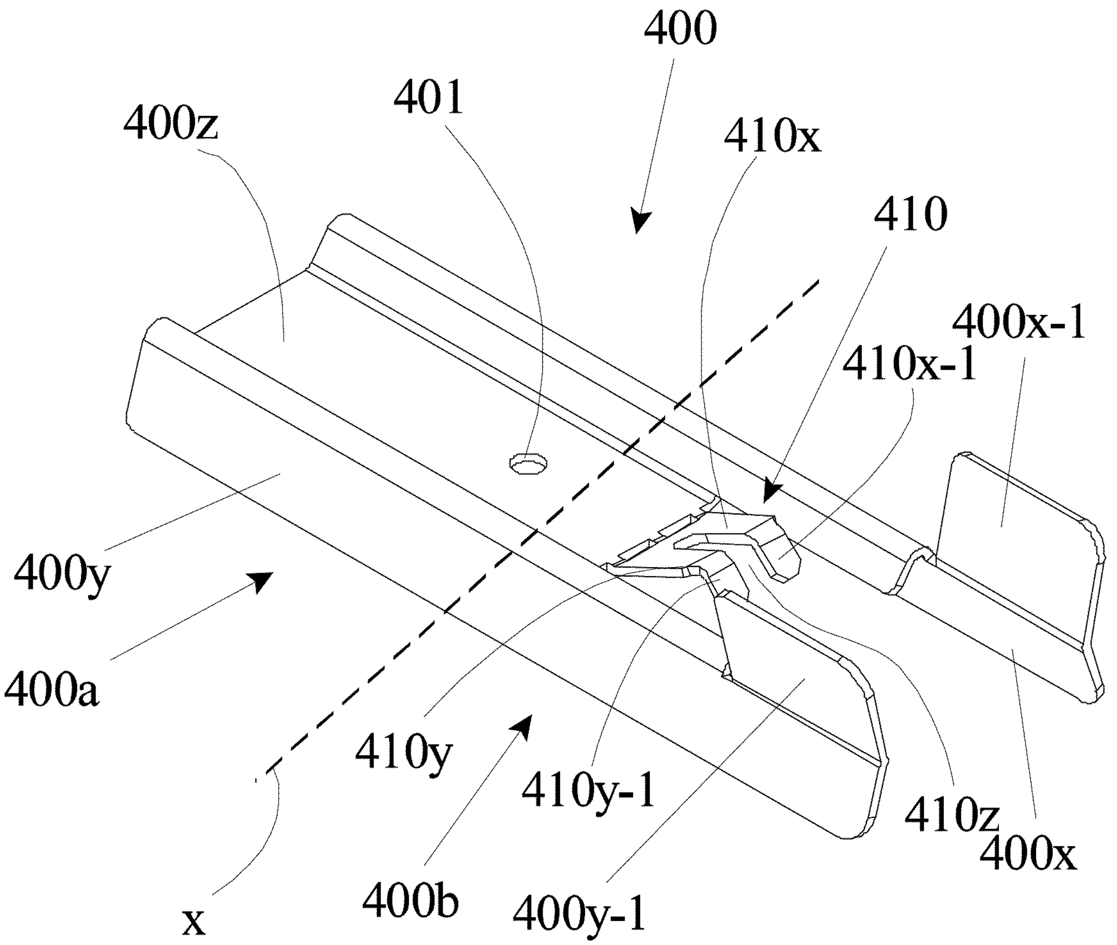
FIG. 4 schematically illustrates a detail of a coupling member for use in an illumination device according to the present disclosure.

For interconnecting the several elongated trunk 100-1; 100-2; . . . ; **100-*n* in line which each other in the longitudinal direction 10***q* as shown in FIGS. 1 and 2 a coupling member 400 is used. An example of such coupling member 400 is shown in FIGS. 1-2, and in more detail in FIGS. 4 and 5.

Known trunked illumination systems fail to provide a complete intermediate gap-free interconnection between adjacent trunks, due to play and deformation between the coupling members and the trunks. Thus, in known systems, adjacent trunks are not properly attuned to one another, leaving a visible intermediate gap present, which adversely affects the look and feel of the illumination system. The coupling member 400 allows for assembling a trunked illumination system for line illumination composed of multiple elongated trunks, which are longitudinally connected in line with each other and with a minimal intermediate gap, which intermediate gap is maintained minimal over length of time.

For clarifying the functionality of the coupling member 400 and its ability to properly minimize the intermediate gap or distance between two adjacent elongated trunks, the intermediate gap is denoted with reference symbol x in FIGS. 1 and 2, with in FIG. 2 the intermediate gap x being minimal or near invisible.

Returning to FIGS. 4-5, the coupling member 400 is formed as a single-piece component, preferably manufactured from a metal, such a steel or aluminum, or manufactured from a light, but durable plastic, such as polycarbonate or polyamide. The single-piece coupling member 400 is preferably manufactured from a sheet of metal and is produced by means of a punch or die-cut manufacturing technique. The sheet of metal could be spring steel, thus enabling repeatedly mounting and dismounting of the mounting element without the mounting element, at least initially, suffering from metal fatigue.

The single-piece coupling member 400 preferable has an appearance which is symmetrical along its longitudinal axis 400*q*. It has a first coupling portion 400*a*, structured to be mechanically fixed at or in the second trunk end portion 100*b* of the housing of the first elongated trunk 100-1, as well as a second coupling portion 400*b*, that is structured to engage at or in the first trunk end portion 100*a* of the adjacent further elongated trunk 100-2.

Figure 3A:
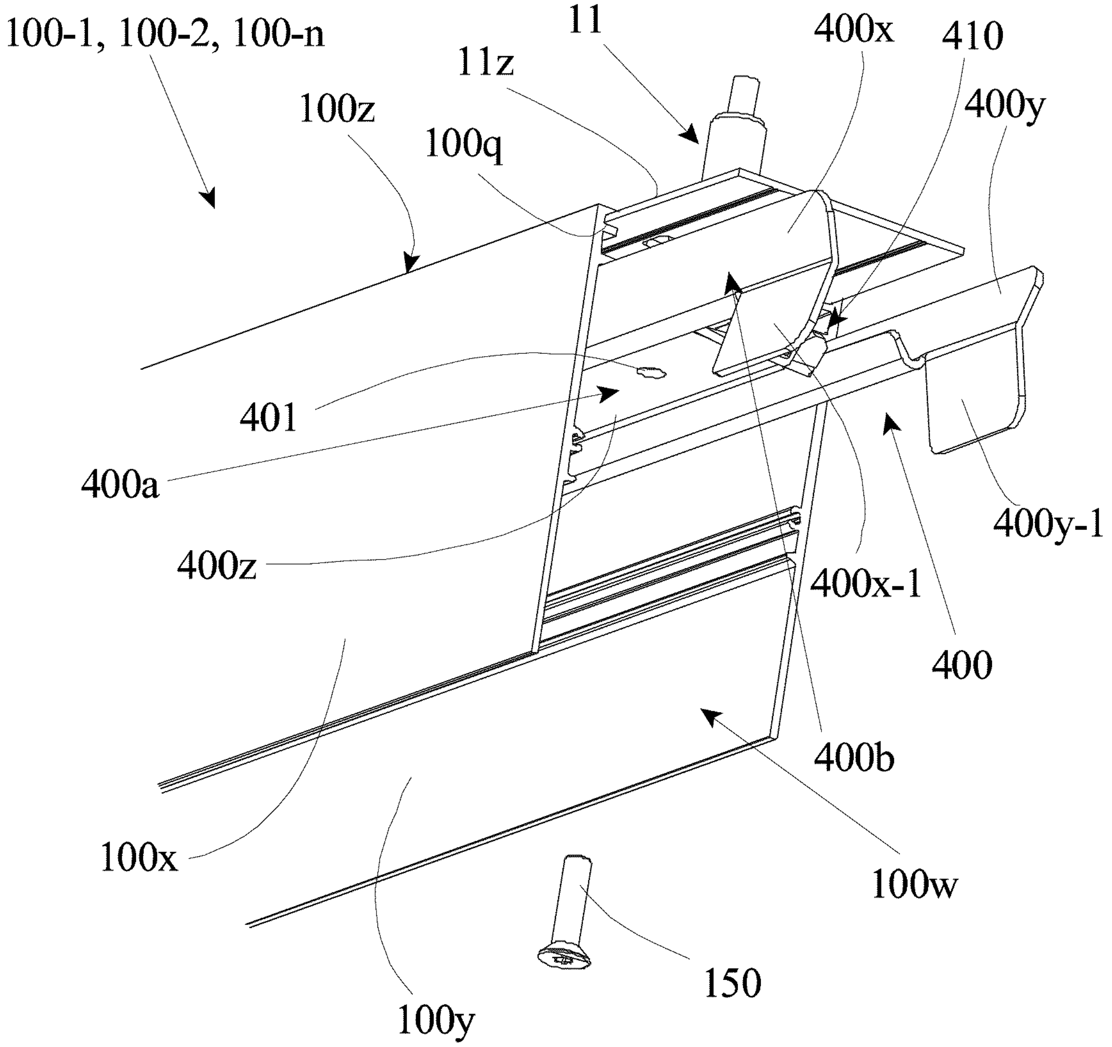
FIGS. 3*a*-3*b* schematically illustrates detailed views of the embodiment of the trunking illumination system according FIGS. 1 and 2.

As depicted in more detail in FIG. 3*a*, when assembling the trunked illumination system 10 the first coupling portion 400*a* reaches via the second trunk end portion 100*b* in the inner space 100*w* of the housing of the first elongated trunk 100-1. In this example, the housing of the (each) elongated trunk 100-1; 100-2; . . . ; 100-*n* is composed of two elongated sections 100*x* and 100*y*, which extend parallel and are spaced apart from each other and which are interconnected with each other at a longitudinal side of each wall section 100*x*-100*y* by means of an interconnecting top (central) wall section 100*z*.

Figure 5:
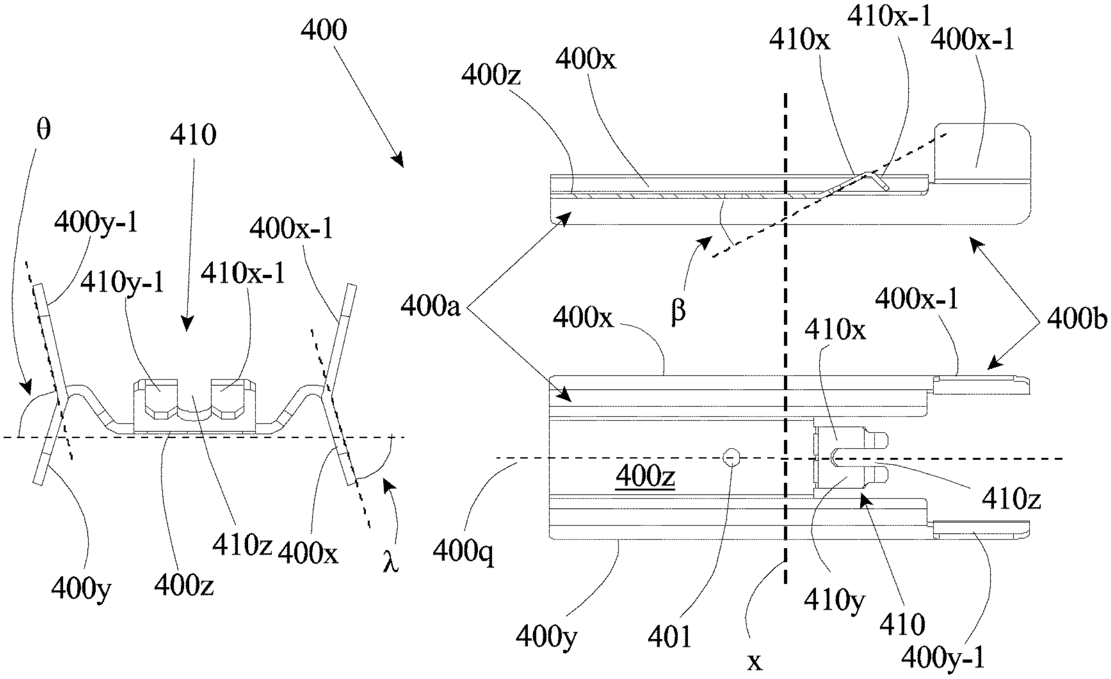
FIG. 5 schematically illustrate yet further details of FIG. 4.
Figure 6A:
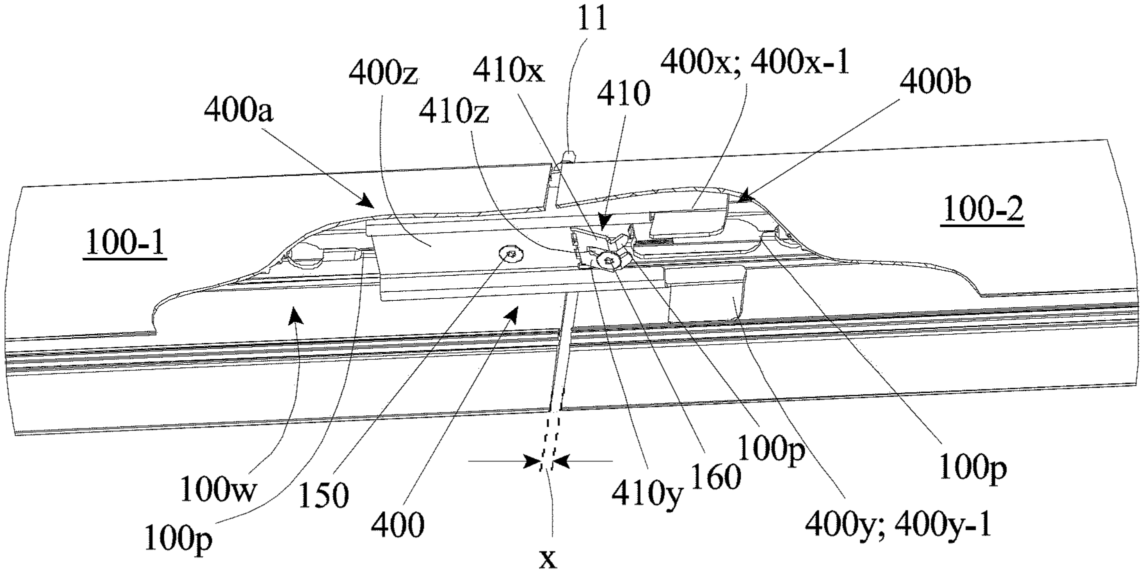
FIG. 6*a* schematically depicts, analogous to FIG. 1, in more detail an embodiment of a trunking illumination system according to the present disclosure in the first configuration.
Figure 6B:
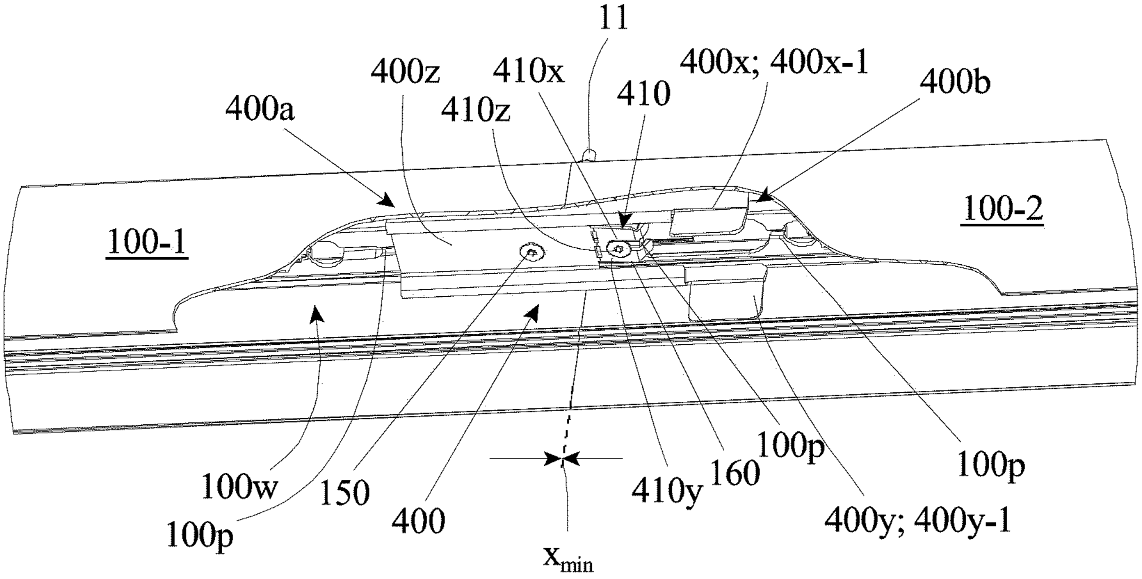
FIG. 6*b* schematically depicts, analogous to FIG. 2, in more detail an embodiment of a trunking illumination system according to the present disclosure in the second configuration.

Similarly, as shown in FIG. 5 combined with FIGS. 3*a* and 6*a*-6*b*, the coupling member 400 may be composed of central member portion 400*z* and two first and second side member portions 400*x* and 400*y*. The central member portion 400*z* of the coupling member 400 engages with or abuts against the top (central) wall section 100*z*, when the first coupling portion 400*a* of the coupling member 400 is mounted or placed in the second trunk end portion 100*b*.

The coupling member 400 comprises a fixating opening 401 through which a fixating pin 150 can be passed for engagement with the first elongated trunk 400-1. Herewith an immovable interconnection of the coupling member 400 with one of the elongated trunks, here trunk 100-1, is guaranteed, without any risk of the occurrence of play or deformation. This allows the coupling member to achieve a proper interconnection with the other adjacent elongated trunk with a long lasting minimal gap distance between them.

In a preferred example, the immovable mechanical interconnection of the coupling member 400 with each second trunk end portion 100*b* of each elongated trunk 100-1; 100-2; . . . ; 100-*n* is established by means of a screw connection. The fixating pin 150 can be a screw provided with a screw thread and structured to be screwed through the fixating opening 401 of the coupling member and in a part of the housing of the elongated trunk 100-1; 100-2; . . . ; 100-*n*. In the example shown in detail in FIG. 3*a*, the central member portion 400*z* of the coupling member 400 engages with or abuts against the top (central) wall section 100*z* of the housing of the elongated trunk 100-1. To this end, the central member portion 400*z* of each elongated trunk 100-1; 100-2; 100-*n* is provided with a fixating/tensioning slot or opening 100*p*. See FIGS. 6*a* and 6*b* for the location of the fixating/tensioning slot or opening 100*p*, which extends along the longitudinal direction of the central member portion 400*z* of each elongated trunk 100-1;100-2; . . . ; 100-*n*.

Figure 3B:
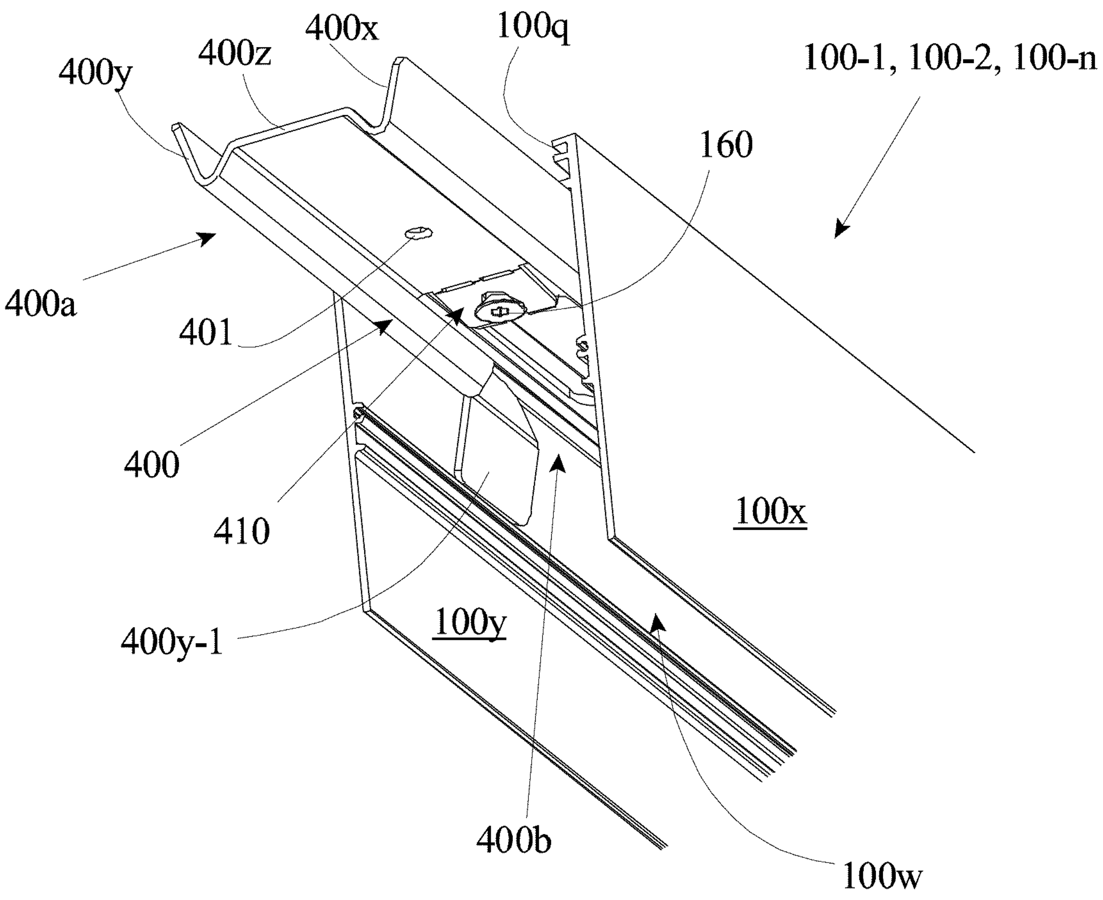

As depicted in more detail in FIG. 3*b* combined with FIGS. 4-5 and 6*a*-6*b*, the second coupling portion 400*b* of the coupling member 400 engages at or in the first trunk end portion 100*a* of the adjacent further elongated trunk 100-2 and is provided with a tensioning flange 410. The tensioning flange 410 has an angled orientation with respect to the longitudinal direction 400*q* (see FIG. 5) of the coupling member 400. In particular, the tensioning flange 410 extends under an angle R from (the plane of) the central member portion 400*z* away from the top (central) wall section 100*z* of the housing of the elongated trunk.

The angle β is preferably in the range of 20°-30°, and more in particular 25°.

The tensioning flange 410 engages with a tension screw 160, which is structured to be mounted or to be accommodated in a fixating/tensioning slot or opening 100*p* extending along the longitudinal direction of the central member portion 400*z* of each elongated trunk 100-1;100-2; 100-*n*. The screw thread of the tension screw 160 interacts with the two side ridges of the tensioning slot or opening 100*p* and guarantees a proper connection between the screw 160 and the slot 100*p* when screwed in. In another example a threaded tensioning opening 100*p* is present in the housing of the further elongated trunk 100-2, in which tensioning opening 100*p* the tension screw 160 fits.

The screwing interaction between the tensioning flange 410 and the tension screw 160 allows for setting the gap distance x between the two elongated trunks 100-1 and 100-2 between a first configuration, wherein the gap distance x is extant or maximal as depicted in FIG. 1 and FIG. 6*a*, and a second configuration depicted in FIG. 2 and FIG. 6*b*, wherein the gap distance x is minimal or absent (indicated in FIG. 6*b* as $x_{min}$), that is the second trunk end portion 100*b* of the elongated trunk 100-1 abuts with an end face 100*b*-1 thereof, essentially with no intermediate gap, against an end face 100*a*-1 of the first trunk end portion 100*a* of the further elongated trunk 100-2.

In more detail, as the coupling member 400 is immovable interconnected with the first elongated trunk 100-1, during screwing by a mechanic with a suitable screw driver, the tension screw 160 is screwed into the tensioning slot or threaded opening 100*p* of the adjacent further elongated trunk 100-2 and imparts a tension force on the tensioning flange 410. Due to its stiff yet angled configuration, the tensioning flange 410 in turn imparts a tension force on the further elongated trunk 100-2, displacing the elongated trunk 100-2 in a longitudinal direction towards the first elongated trunk 100-1.

Accordingly, the gap distance x between both adjacent trunks 100-1 and 100-2 is minimized, such that the junction between both trunks 100-1 and 100-2 is barely visible to the human eye as shown in FIG. 2 and FIG. 6*b*.

In a preferred example, the tensioning flange 410 comprises two spaced apart tensioning flange members 410*x* and 410*y* and the tension screw 410 can be accommodated in the intermediate space 410*z* formed between these tensioning flange members 410*x* and 410*y*. Accordingly, the tension screw 410 is properly surrounded by both flange members 410*x* and 410*y*, ascertaining a secure interlocking of the tension screw 160 by the tensioning flange 410. This results in a proper visible alignment of both adjacent trunks when minimizing the gap distance x and results more over in a long lasting imparting of the tension via the flange 410 on the adjacent elongated trunk.

Figure 7A:
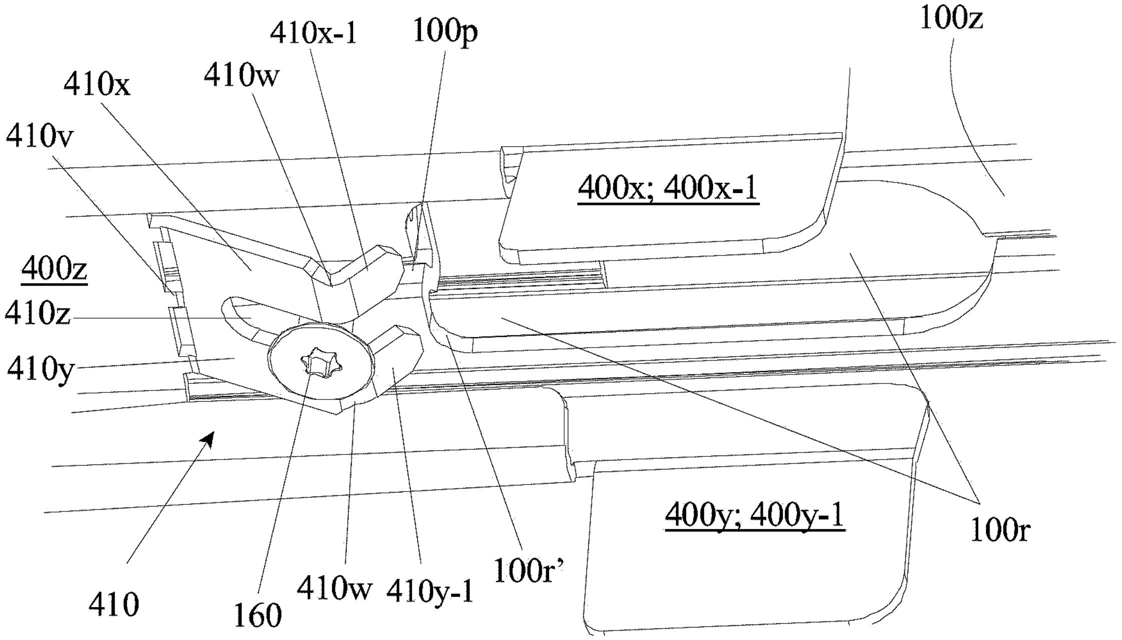
FIG. 7*a*-7*b* show more detailed views of FIGS. 6*a* and 6*b*, respectively.
Figure 7B:
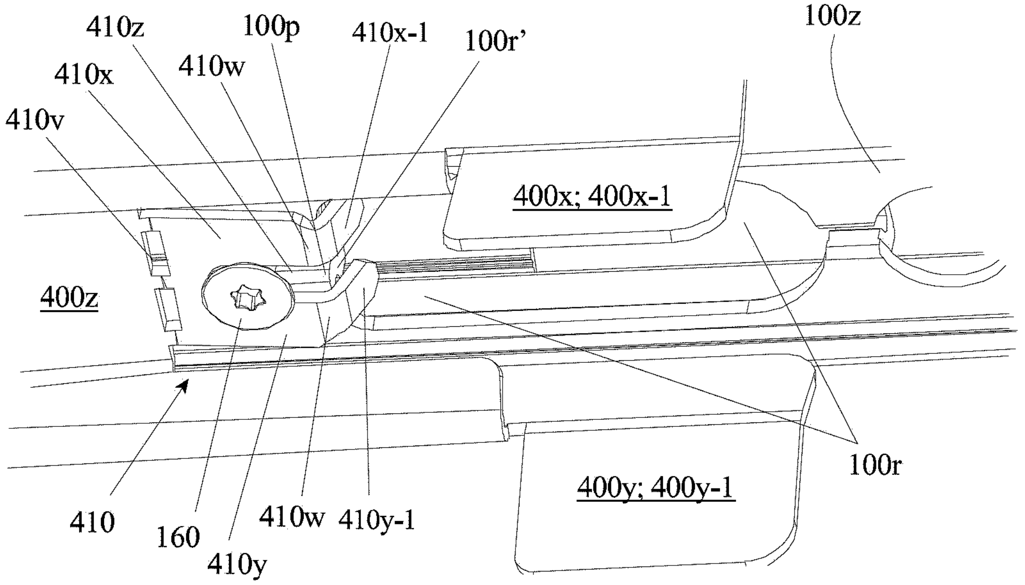

In a further detail, also depicted in FIGS. 7*a* and 7*b* which show more detailed views of FIGS. 6*a* and 6*b* respectively, the tensioning flange 410 is connected by means of a flange bent line 410*v* with the central member portion 400*z* of the coupling member 400 whereas the free tips 410*x*-1, 410*y*-1 of the flange members 410*x* and 410*y* are bent along a tip bent line 410*w*. The flange bent line 410*v* as well as the tip bent lines 410*w* along deformation of the tensioning flange 410 during the screwing in of the tension screw 160 in the tensioning slot 100*p*.

During the screwing interaction between the tensioning flange 410 and the tension screw 160 the free tips 410*x*-1, 410*y*-1 abut against a circumferential contact edge 100*r*' of a wall section recess 100*r* present in the center wall section 100*z* of the elongated trunk 100-2. The abutment of the free tips 410*x*-1, 410*y*-1 against the circumferential contact edge 100*r*' creates a tension force in the longitudinal direction of the elongated trunk 100-2 causing the elongated trunk 100-2 to be displaced towards the first elongated trunk 100-1, thus minimizing the gap distance x.

In order to ascertain a proper engagement of the coupling member 400 with the both adjacent elongated trunks 100-1 and 100-2 and more importantly to guarantee an visually ideal alignment of both trunks with a minimal gap distance x, the coupling member 400 is provided at least one side member portion, but preferably with two side member portions 400*x* and 400*y*. Each side member portions 400*x* and 400*y* are structured to engage with an opposite wall section 100*x* and 100*y* of both the first elongated trunk 100-1 and the further elongated trunk 100-2. Note, that a proper engagement and visual alignment is also possible with the coupling member 400 having only side member portion engaging with a wall section of the housing of the adjacent elongated trunks.

A further improved engagement between the coupling member 400 with one of the elongated trunks 100-1; 100-2 and further enhancing the visual alignment of the adjacent trunks, the one or two side member portions 400*x* and 400*y* may be provided at the second coupling portion 400*b* thereof with a flange extension 400*x*-1 and 400*y*-1. Accordingly, as the coupling portion 400*a* of the coupling member 400 is already immovable connected with the first elongated trunk by means of the fixating pin 150 as outlined above, the flange extensions 400*x*-1 and 400*y*-1 provided at the side member portions 400*x* and 400*y* at the second coupling portion 400*b* side thereof establish an improved engagement with the first trunk end portion 100*a* of the further elongated trunk 100-2. Accordingly, the alignment of both adjacent trunks is improved, further minimizing the visibility of the junction between both trunks and minimizing the gap distance.

In particular the side member portions 400*x* and 400*y* as well as their flange extensions 400*x*-1 and 400*y*-1 are configured in an angled orientation with respect to the plane formed by the interconnecting top (central) wall section 100*z*, in particular at an angle θ for the side member portions 400*x* and 400*y* and at an angle λ for the flange extensions 400*x*-1 and 400*y*-1. Preferably the angle θ ranges between 70°-85°, preferably 77°, whereas the angle λ ranges between 70°-80° and preferably 73°. The angled orientations of the side member portions 400*x* and 400*y* as well as their flange extensions 400*x*-1 and 400*y*-1 result in a slight deformation when positioned within each elongated trunk. This slight deformation or pretension against the inner surface of the wall sections 100*x* and 100*y* of each elongated trunk 100-1; 100-2; 100-*n* guarantees a proper alignment of both elongated trunks at their junction, further minimizing the visibility of the junction between both trunks and minimizing the gap distance.

Additionally, this construction further improves the immovable interconnection and prevents the occurrence of play and/or deformation of the several parts interconnecting with each, thus maintaining the minimal gap distance between adjacent trunks, also after a significant time of use of the illumination system 10.

LISTING OF REFERENCE NUMERALS USED

10 trunking illumination system
10*q* longitudinal direction of trunking illumination system
11 mounting element
11*z* mounting edge of mounting element
100-1 first elongated trunk
100-2, 100-*n* further elongated trunk
100*a* first trunk end portion
100*a*-1 end face of first trunk end portion
100*b* second, opposite trunk end portion
100*b*-1 end face of second trunk end portion
100*p* tensioning slot or opening
100*q* mounting slit for mounting element
100*r* wall section recess
100*r*' contact edge of wall section recess
100*w* inner space of elongated trunk
100*x* first wall section of elongated trunk
100*y* second, opposite wall section of elongated trunk
100*z* central wall section
150 fixating pin
160 tension screw
x gap between adjacent elongated trunks
300 elongated lighting carrier
400 coupling member
400*a* first coupling portion
400*b* second coupling portion
400*q* longitudinal axis of coupling member
400*x* first side member portion of coupling member
400*y* second, opposite side member portion of coupling member
400*z* (central) member section of coupling member
400*x*-1, 400*y*-1 flange extension of side member portion
410 tensioning flange
410*v* flange bent line
410*w* tip bent line
410*x*, 410*y* first and second tensioning flange members
410*x*-1, 410*y*-1 first and second tensioning flange member tips
410*z* intermediate space between tensioning flange members

The invention claimed is:

1. An illumination system for line illumination comprising:

an elongated trunk having a first trunk end portion and an opposite second trunk end portion, at least a further elongated trunk having a first trunk end portion and an opposite second end portion, as well as a coupling member arranged for longitudinally connecting the first elongated trunk in line with an adjacent further elongated trunk thereby forming a self-sustained trunked illumination system, the coupling member having a first coupling portion to be fixed with the elongated trunk at its second trunk end portion thereof, as well as a second coupling portion structured to engage with the adjacent further elongated trunk at its first trunk end portion, the second coupling portion arranged in setting a gap distance between the two elongated trunks between a first configuration, wherein the gap distance is extant and a second configuration, wherein the gap distance is minimal, by imparting a tension force on the further elongated trunk in a longitudinal direction towards a first elongated trunk, wherein the second coupling portion comprises a tensioning flange structured to engage with a tension screw accommodated in an opening in the further elongated trunk.

2. The illumination system according to claim 1, wherein the first coupling portion comprises a fixating opening through which a fixating pin can be passed for engagement with the first elongated trunk.

3. The illumination system according to claim 1, wherein the first coupling portion comprises at least one member portion structured to engage with a wall section of the first elongated trunk.

4. The illumination system according to claim 3, wherein the member portion is provided with the fixating opening.

5. The illumination system according to claim 1, wherein the coupling member is made in one piece of resilient material.

6. The illumination system according claim 1, wherein the tensioning flange comprises two spaced apart tensioning flange members for accommodating the tension screw there between.

7. The illumination system according to claim 1, wherein the tensioning flange is angled with respect to a longitudinal direction of the coupling member.

8. The illumination system according to claim 1, wherein the coupling member comprises at least one side member portion structured to engage with a wall section of both the first elongated trunk and the further elongated trunk.

9. The illumination system according to claim 8, wherein the coupling member comprises two side member portions, each structured to engage with an opposite wall section of both the first elongated trunk and the further elongated trunk.

10. The illumination system according to claim 8, wherein the at least one side member portion comprises a flange extension structured to engage with the wall section of the further elongated trunk.

11. The illumination system according to claim 1, wherein each elongated trunk is arranged in accommodating an elongated lighting carrier comprising at least one solid state light emitting source to form a continuous line of light.

12. A coupling member for use in a trunking illumination system as described in claim 1.

* * * * *